June 25, 1929. E. J. SWEETLAND 1,718,390
RENEWABLE FILTER UNIT FOR INTERNAL COMBUSTION ENGINE LUBRICATION SYSTEMS
Filed Feb. 19, 1923 3 Sheets-Sheet 1
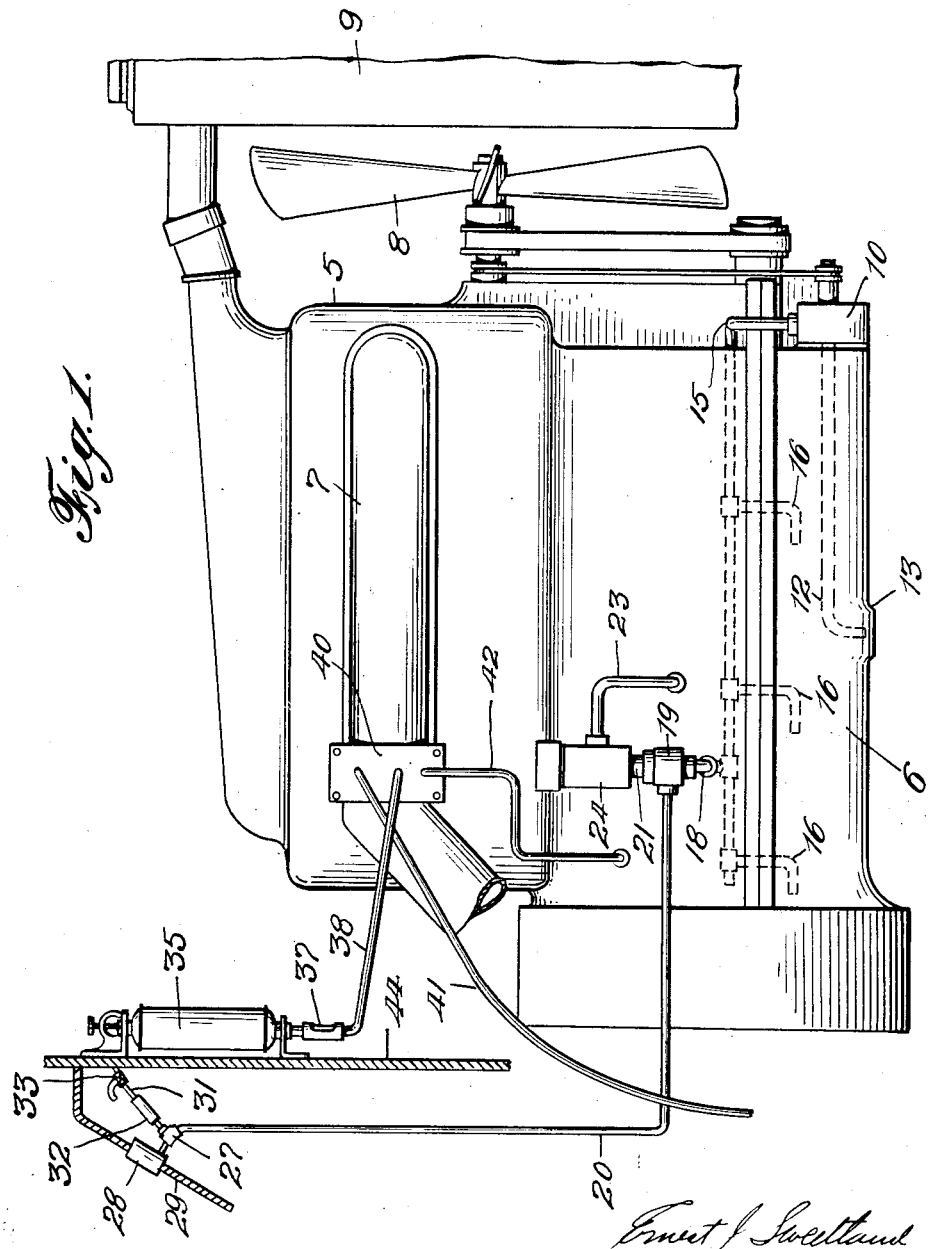

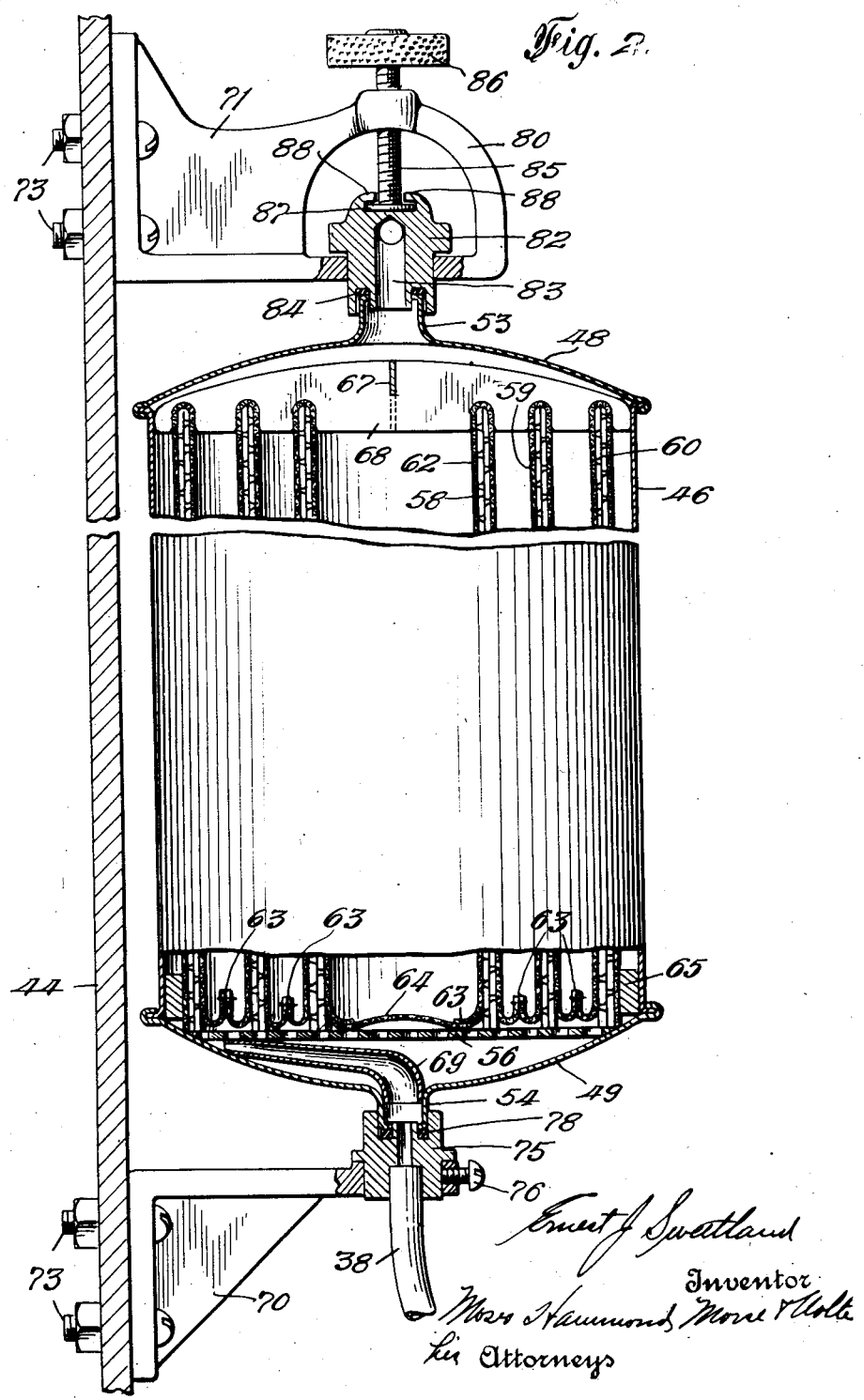

June 25, 1929. E. J. SWEETLAND 1,718,390
RENEWABLE FILTER UNIT FOR INTERNAL COMBUSTION ENGINE LUBRICATION SYSTEMS
Filed Feb. 19, 1923 3 Sheets-Sheet 3
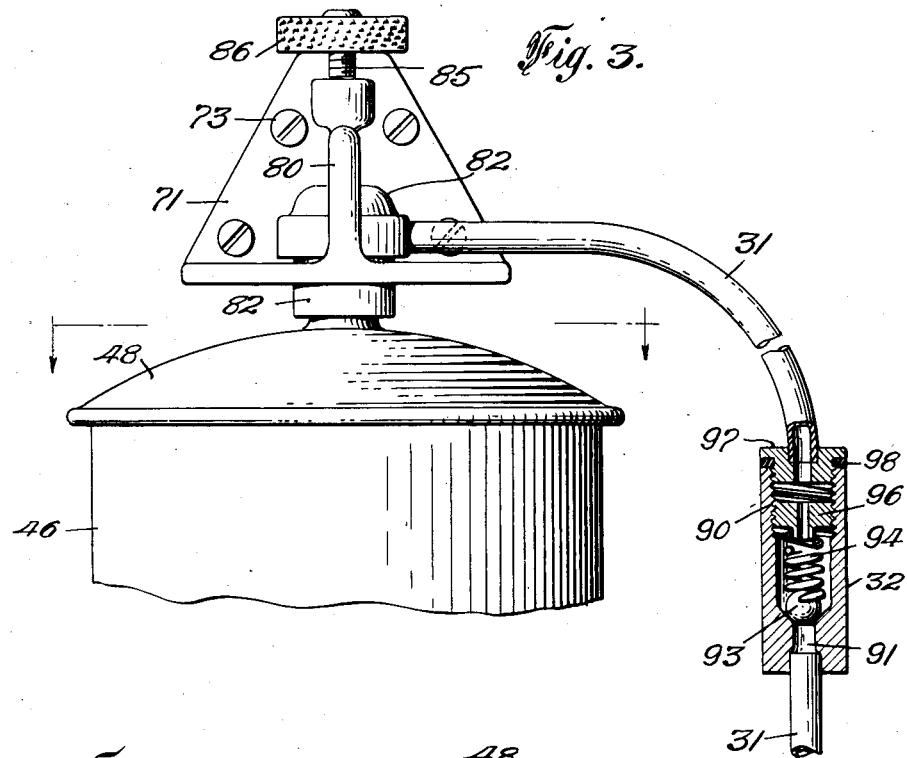
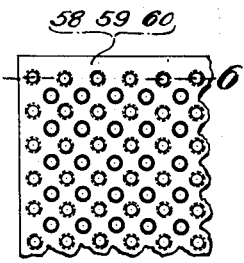
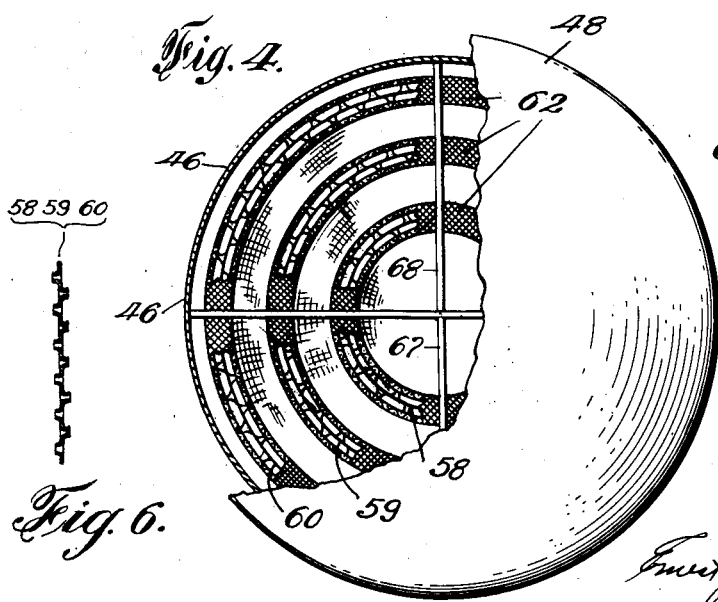

Patented June 25, 1929.

1,718,390

UNITED STATES PATENT OFFICE.

ERNEST J. SWEETLAND, OF HAZLETON, PENNSYLVANIA.

RENEWABLE FILTER UNIT FOR INTERNAL-COMBUSTION ENGINE LUBRICATION SYSTEMS.

Application filed February 19, 1923. Serial No. 620,087.

My invention relates to lubricating systems for internal combustion engines, and particularly to a method of and apparatus for keeping free of deleterious matter the oil used in such systems without removing the oil from the latter.

In this application I have shown and described a method and apparatus whereby the oil in the lubricating system of an internal combustion engine may be freed from all solid impurities and the impurities removed from the system by removing and discarding as a unit the impurity intercepting means. No claim is being made however to the broad idea of a sealed discardable filter unit and method of using the same in the present application as this is a joint invention of myself and George H. Greenhalgh and is being claimed in a joint application Ser. No. 677,344, filed Nov. 27, 1923.

It is one of the objects of the present invention to provide a filter unit which will provide a large filtering area in a comparatively small space, and which can be easily manufactured at a small cost so as to permit economically discarding the unit when it becomes fouled with the sediment collected from the oil as described in the above entitled application.

Another object of the invention is to provide a sealed cylindrical filter casing which can be formed by utilizing conventional can manufacturing methods and machinery and to provide the same with inlet and outlet openings for quick connection or removal from the circulatory system of the machine with which it is to be used.

Another object of the invention is to provide bracket supporting means adapted to be permanently connected in the lubricating system of the machine and to detachably support a filter unit of the type described in communication with said system.

Other objects of the invention will hereinafter appear, and the novel structures by which they are attained will be pointed out in the appended claims.

The invention will be understood from the following description, taken in connection with the accompanying drawings, in which Fig. 1 is a side elevation, more or less diagrammatic in form, of an internal combustion engine having my invention applied thereto. Fig. 2 is an elevation, partly in section of my improved filter and the means for supporting it; Fig. 3 is a fragmentary elevation, partly in section, of the top portion of my filter; Fig. 4 is a top plan view, partly in section of my filter; Fig. 5 is a fragmentary view of a portion of one of the drainage members used in my filter; and Fig. 6 is a section on the line 6—6 of Fig. 5.

The principal features of the automobile engine shown in Fig. 1 are the cylinder block 5, the crank case 6, exhaust manifold 7, fan 8, and radiator 9. In accordance with the common practice, it is assumed that the lubricating oil for the engine is stored in the bottom of the crank case 6, from which it is drawn by the oil pump 10 and supplied to the bearings and to the devices which free the oil from deleterious matter after which it flows back to the crank case. The oil pump 10 is shown as connected on its intake side to the pipe 12, the end of which extends preferably to the lowest point in the crank case, for example, into the depression 13; and on its outlet side said pump is connected to the pipe 15, from which branch pipes such as 16 lead to the various bearings to be lubricated. Branching from the pipe 15 is a pipe 18 provided with a T fitting 19 to which pipes 20 and 21 are connected. The pipe 21 is connected to a pipe 23 leading back to the crank case 6, through the safety valve 24 which may be of any simple form. Normally, the valve 24 does not permit oil to pass back to the crank case through it, but this valve will open if the pressure against which the oil pump 10 is working is abnormally increased on account of excessive viscosity of the oil or due to high speed of the engine.

As shown in the drawing, the pipe 20 leads through the T fitting 27 to an oil gage 28, mounted in the instrument board 29. Connected with the other outlet of the T fitting 27 is a pipe 31 in which is interposed a loaded valve 32, hereinafter described, and a cock 33. This pipe 31 is connected to the intake end of the filter 35, which will be hereinafter described in detail. At its outlet end, the filter 35 is connected, preferably through a sight-feed pipe 37 to a pipe 38, leading to a distilling device or purifier 40, which is mounted adjacent to and is heated by the exhaust manifold 7. The detail construction of the distilling device 40 need not be herein described as it forms no part of the present invention, further than to say that it serves to distill out of the lubricating oil the major part of the water, gasoline, kerosene and other light hydro-carbons which escape through the pipe 41 and may be collected in a suitable receptacle or may be allowed to escape, while the lubricating oil returns to the crank case through the pipe 42.

Having described the manner in which the various parts of the lubricating system shown in Fig. 1, are connected and co-operate with one another, the detail construction of the filter and the means by which it is removably mounted on the dash 44 of the vehicle will now be described.

Referring to Figures 2, 3, and 4, the casing of the filter is shown as comprising a cylindrical shell 46, to the ends of which are permanently attached dished heads 48 and 49. The ends of the shell 46 are preferably bent outwardly and the flanges thus provided are engaged by rolled or crimped edges of the heads 48 and 49, the joints thus formed being sealed in a convenient manner as by rolling or brazing or soldering. The members 48 and 49 are provided with necks 53 and 54 having openings therethrough which serve as intake and outlet passages of the filter. Before the upper head 48 is attached to the casing 46, the filter elements which will now be described are installed therein. These elements are supported upon a foraminous plate 56, which rests on the inside of the dished head 49. This plate 56 supports a plurality of tubular drainage members 58, 59 and 60 which are concentrically arranged. These drainage members, which may be conveniently formed of sheet metal, in the manner shown in Figures 5 and 6, are covered with any suitable filter cloth, such as cotton, canvas or drill. This fabric may or may not be treated chemically or otherwise to improve its filtering qualities. I have found, however, that ordinary filter cloth, unless very thick and closely woven, does not produce a clear filtrate at the start, and in order to overcome the objection of using thick and expensive fabrics I prefer to use a thin cloth, preferably with considerable nap on its surface and treat this cloth with a coating of keiselguhr or finely divided charcoal, or other suitable substances which are unsoluble in oil, in order to enhance the filtering qualities of the cloth and thus produce a clear filtrate from the time the filter is first placed in service. As shown in the drawings, the filter cloth 62 is made of a plurality of pieces, sewed together as indicated at 63, and then assembled over the drainage members 58, 59 and 60. Within the drainage member 58, the filter cloth forms a bag the bottom 64 of which covers the top of the central portion of the foraminous plate 56; and the portions of the foraminous plate between the drainage members 58 and 59 and between the drainage members 59 and 60 are similarly covered by the filter fabric; while the outer edge of the filter fabric is clamped against the outside of the drainage member 60 by a ring 65 of felt or other suitable material, interposed between the fabric and the shell 46. In order to hold the tubular drainage members 58, 59 and 60 stationary within the filter casing under the influence of vibration to which the filter may be subjected, there is preferably interposed between the head 48 and the upper edges of said drainage members, a spacing member, of any suitable kind, for example, one made of two pieces 67 and 68 of stamped metal of the form shown, slotted and fastened together in the form of a cross. Although a filter of the kind we have shown and described is preferably used with its axis in a vertical position as shown in the drawings, it may under some conditions be found desirable to mount the filter with its axis horizontal. In order to facilitate the escape of trapped air when the filter is so mounted, there may be provided within the dished head 49 a tube 69, of the form shown, connecting with the outlet through the neck 54 in the head 49. When this tube 69 is provided, the outside of the filter casing is appropriately marked so as to indicate that it should be mounted in a position corresponding to the upright position of the tube 69.

As hereinbefore stated, the filter which has just been described is constructed with the idea that it will be removed and thrown away after it has been used sufficiently long to become so filled with impurities extracted from the oil that its usefulness has been materially lessened if not entirely destroyed. The means by which the filter may be supported, in a manner which will permit its ready insertion and removal, will now be described.

As shown, this means comprises a lower bracket 70 and an upper bracket 71 which may be secured to the dash 44 by bolts 73, or may be supported in any other suitable manner. The lower bracket 70 supports a removable seat 75 which may be secured in a hole in the bracket by means of a set screw 76. The seat 75 is provided with a passage therethrough which at its lower end communicates with the pipe 38 the end of which is permanently secured to said seat in any suitable manner; and at its upper end said passage opens into an enlarged cavity in the seat 75, having therein an annular recess adapted to receive a gasket 78. The end of the neck 54 is adapted to enter the cavity in the top of the seat 75, and the edges of said neck rest on the gasket 78 whereby a tight connection is made between the outlet end of the filter and the seat 75. The upper bracket 71, which is provided with a yoke portion 80 as shown, carries a sliding feed connection 82, which may be of the form shown and which is provided with an opening 83 with which the pipe 31 is in permanent communication. The bottom of this sliding feed connection 82 is provided with an annular cavity at the top of which is inserted a gasket 84 adapted to be engaged by the upper end of the neck 53 of the filter. The feed connection 82 may be moved vertically in the bracket yoke 80 by means of a screw 85 threaded in the top of the bracket yoke and provided at its upper end with a knurled head 86 and at its lower end with a flange 87 engaging the top of the feed connection 82 and lips 88 provided thereon. With this arrangement, it will be obvious that the feed connection 82 may be raised and lowered by means of the screw 85 for the purpose of permitting a used filter to be removed and a new one inserted. By screwing the screw 85 downwardly after the filter has been inserted between the seat 75 and the sliding feed connection 82, the gaskets 78 and 84 are put under compression and leakage at the outlet and inlet openings of the filter is effectively prevented.

The construction and the function of the loaded valve 32 will now be described. This valve, obviously may be of many forms, one of which is shown in cross section in Figure 3. As therein shown, this valve comprises a casing having a cavity therein which at one end is threaded as indicated at 90, and at the other end communicates with a passage 91. Communication between the cavity and the passage 91 is controlled by means of a ball valve member 93, which is yieldingly held in the position shown by means of a spring 94 put under compression between the ball 93 and a perforated plug 96 adapted to be screwed into the threaded portion 90 of the valve casing. There is also screwed into the threaded portion 90 of the casing a perforated flanged cap 97 with which a gasket 98 cooperates. As hereinbefore stated, this loaded valve 32 is interposed in the pipe 31; and it will be obvious from Fig. 3 how the ends of the pipe 31 are connected to the said valve. The purpose of the valve 32 is to insure that the path of the oil through the filter will always offer at least a considerable resistance to the flow of the oil therethrough.
A new, clean filter inserted in the system may offer at first comparatively little resistance to the passage of oil therethrough, and if the valve 32 or its equivalent were not employed, it might happen in some cases that the path of oil through the filter would offer so much less resistance to the flow of oil than the paths for the flow of oil through the engine bearings, that the pressure of the oil supplied to the latter would be insufficient to sufficiently lubricate said bearings. By providing the loaded valve 32, this possibility is prevented.

The mode of operation of the system and the apparatus herein described will be obvious. The oil pump 10, drawing oil from the crank case supplies it under pressure to the engine bearings and also to the filter 35 and the distilling device 40 from which the oil, substantially free of deleterious matter, gasoline and other light hydro-carbons and water, flows back to the crank case. The filter 35 is so constructed and designed that the inlet and outlet projections 53 and 54 differ in size or shape so that it cannot by mistake be inserted backwards. Under ordinary circumstances it will not become so filled with impurities as to interfere with its function until the engine has been used for a considerable period of time, for example, in the case of an automobile, until the car has been run several thousand miles. The proper time to remove the filter 35 and replace it by a new one can be determined in different ways, for example by observing in the sight feed pipe 37 the volume and condition of the oil coming from the filter, by taking a sample of oil from the crank case and observing its condition, or upon an arbitrary basis according to the length of time the filter has been in use or the number of miles which the automobile has been driven since the filter was inserted. It is a matter of only a few moments' work to remove the filter and insert a new one in the manner hereinbefore described, and this removal and insertion can be attended to by any one without a chance of improper assembly. There is thus provided a new method of and means for constantly removing the deleterious matter which tends to accumulate in the lubricating oil of an internal combustion engine, without withdrawing the oil from the oil circulatory system of the engine.

While I have described certain apparatus for carrying out my invention, it is to be understood that this is merely illustrative and that it may be modified in many respects without departing from the spirit of the invention as defined in the appended claims.

What I claim is:

1. The combination with the lubricating system of an internal combustion engine of a filter adapted for removing deleterious matter from lubricating oil in said system, comprising a cylindrical casing provided at its ends with heads having unthreaded openings therein, a filter element arranged within said casing in the path of the oil passing therethrough and means connected in said lubricating system for removably supporting said casing and making liquid tight connection with said unthreaded openings through said heads whereby said filter may be readily inserted in and removed from a lubricating system.

2. The combination with the lubricating system of an internal combustion engine of a filter adapted for removing deleterious matter from lubricating oil, comprising a casing having at its opposite ends perforated necks adapted to serve as inlet and outlet passages, a fixed supporting member connected in said lubricating system adapted to cooperate with one of said necks, a movable supporting member connected in said lubricating system adapted to cooperate with the other neck, and means to move said movable supporting member whereby said filter is removably supported and connected in the lubricating system by said necks through which oil passes to and from said filter.

3. In a fluid circulating system, a filter unit, means to circulate the fluid through said system, means in said filter unit to separate solid particles from the fluid circulating therethrough, and means for supporting and detachably connecting said filter unit into said circulatory system, comprising a pair of bracket members and means to move a portion of said bracket members toward and away from each other, without rotational movement thereof to clamp the filter unit therebetween.

4. In a fluid circulating system, a filter unit, means to circulate the fluid through said system, means in said filter unit to separate solid particles from the fluid circulating therethrough, and means for supporting and detachably connecting said filter unit into said circulating system, comprising a pair of bracket members, means connecting the bracket members with said circulating system, and means to move a portion of said bracket members toward and away from each other, without rotational movement thereof to clamp the filter unit therebetween in communication with said system.

5. In the lubricating system of an internal combustion engine, a discardable filter unit, means to circulate the lubricant through said system and filter unit, means in said filter unit to separate the solid particles from said lubricant means for detachably connecting said filter unit into said system, comprising a support for one end of the filter unit, a movable connecting member at the other end of said support and means to move said movable connecting member toward or away from said support without rotating the same.

6. In a combination with the lubricating system of an internal combustion engine, means to detachably support a filter unit in communication therewith, comprising a pair of bracket members, inlet and outlet connections to and from said system in said brackets and means to move a portion of one bracket toward or away from the other bracket, without rotational movement thereof to clamp a filter unit between the brackets and establish communication through said brackets with said filter unit.

7. The combination with a filter unit having inlet and outlet connections at opposite portions thereof of means to support and detachably connect said filter unit to a circulating system, comprising a pair of oppositely disposed brackets, inlet and outlet connections to the circulating system in said brackets adapted to form a fluid tight connection with the inlet and outlet connections of said filter unit and means to move one of said brackets toward or away from the other bracket without rotational movement thereof to clamp the filter unit therebetween.

In witness whereof, I have set my hand and seal this seventeenth day of February, 1923.

ERNEST J. SWEETLAND.